April 10, 1956  R. B. JOHNSON  2,741,312
INDICIA-CONTROLLED RECORD PERFORATING MACHINE
Filed Sept. 18, 1951  3 Sheets-Sheet 1
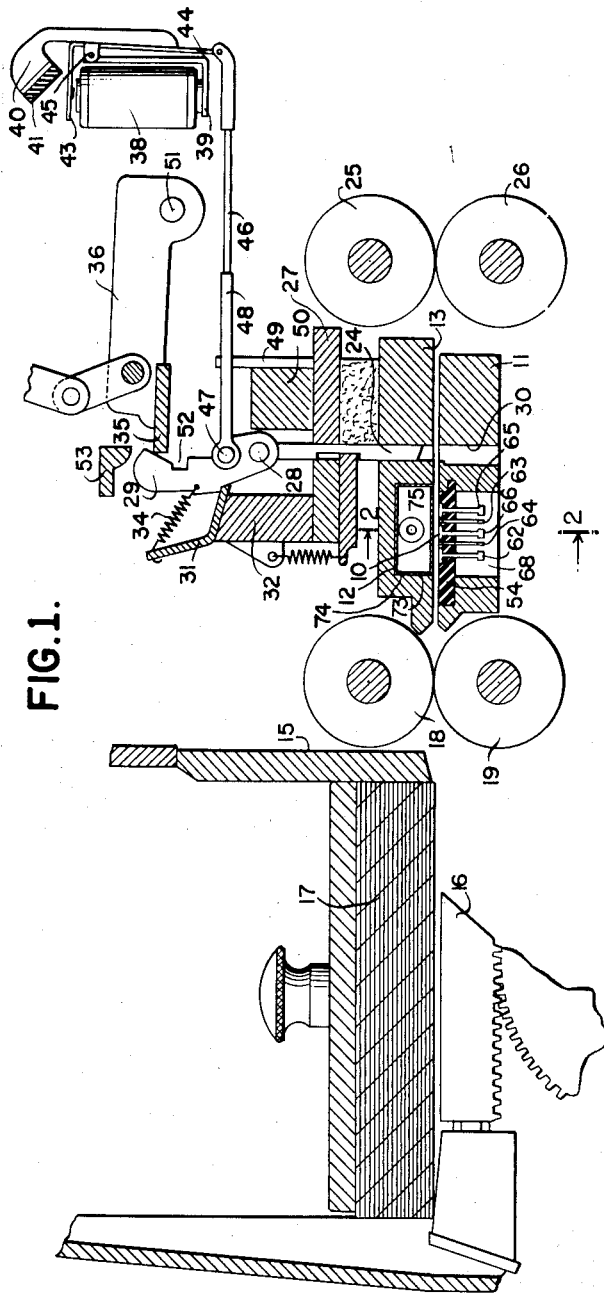
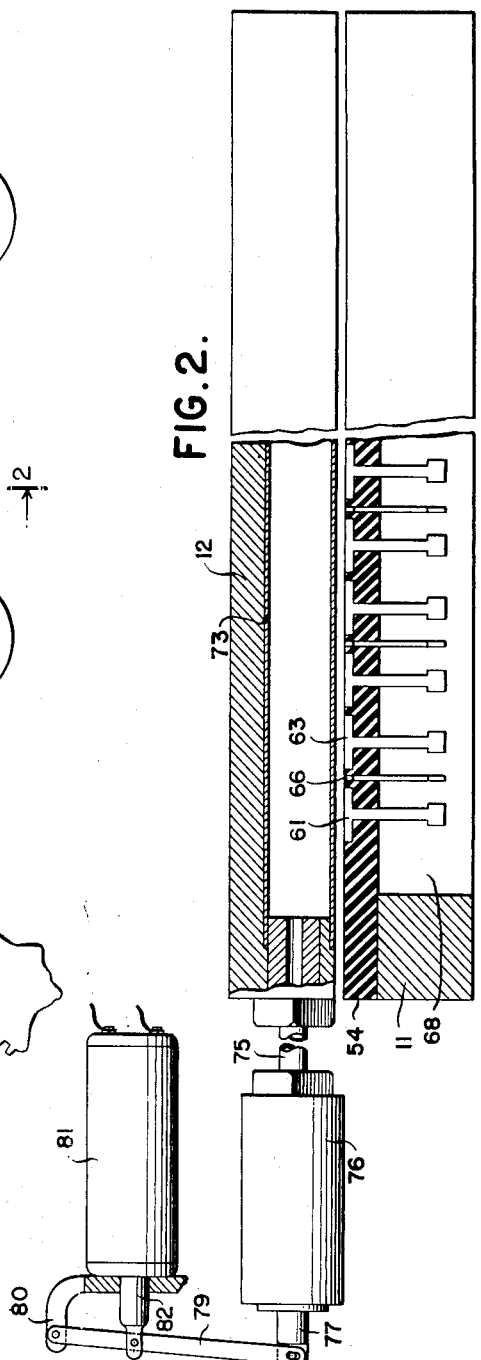
INVENTOR
REYNOLD B. JOHNSON
BY William Lang
ATTORNEY April 10, 1956  R. B. JOHNSON  2,741,312
INDICIA-CONTROLLED RECORD PERFORATING MACHINE
Filed Sept. 18, 1951  3 Sheets-Sheet 2
FIG.3.
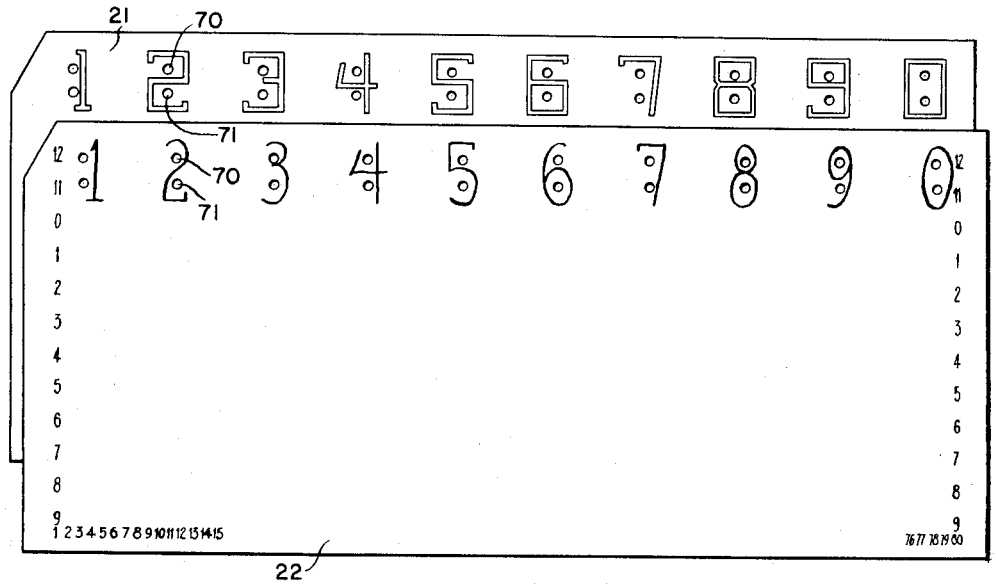
FIG.4.
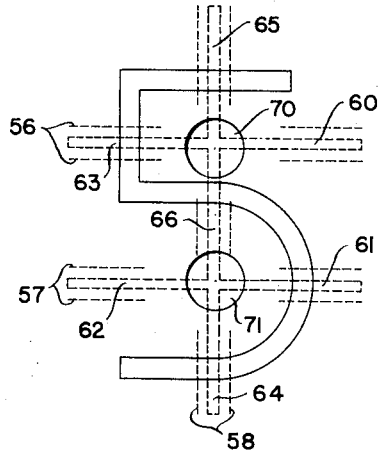
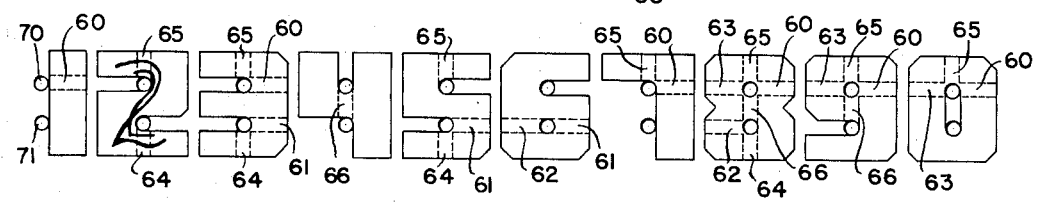
FIG.5.
INVENTOR
REYNOLD B. JOHNSON
BY William Lang
ATTORNEY

United States Patent Office

2,741,312
Patented Apr. 10, 1956

2,741,312

INDICIA-CONTROLLED RECORD PERFORATING MACHINE

Reynold B. Johnson, Binghamton, N. Y., assignor to International Business Machines Corporation, New York, N. Y., a corporation of New York Application September 18, 1951, Serial No. 247,051

2 Claims. (Cl. 164—115)

This invention relates to devices for reading characters carried by a record sheet, and more particularly to means for reading Arabic numerals printed or written on a record sheet and effecting operation of a record perforating machine in accordance with the values of the numerals.

A basic operation in punched card accounting or statistical machine practice is the transcription of original data, entered in some form on original records, into punched record form for use in controlling the various automatic accounting and statistical machines. This operation is generally performed by key operated punches wherein the data entered into the records in the form of perforations is determined by the manual operation of keys. The speed and accuracy of the transcription of the original data into punched record form in this manner is, as a result, dependent upon the operator's skill and care, which, of course, vary widely from operator to operator. In operations where accuracy of transcription is a necessity, further verifying operations are usually required to check the perforations in the records with the original information before the perforated records are used in controlling the operations of the various machines.

A more efficient and accurate manner of transcribing original data to punched record form, as described and claimed in Patent Number 2,007,391 to James W. Bryce, and Patent Number 2,275,396 to Reynold B. Johnson, involves the entry of original data onto a record which also becomes the punched transcript record. The original data is entered on this record by making marks with conductive ink or pencil at differentially placed index positions on the record. The records are then fed to a machine which senses and analyzes the marks and automatically effects the punching of perforations into the record at positions corresponding to the sensed conductive marks. In this manner, manual transcription of original data to punched record form is eliminated and increased speed and accuracy of transcription is obtained. Although this automatic transcription system was a marked advance over the conventional manual transcription method of preparing punched records from original data, it involved the recording of the original data in special form rather than conventional written form. As a result, the speed and accuracy of the recordation of original data was decreased to some extent.

The instant invention by providing a device capable of sensing Arabic numerals written with conductive ink on records, and by providing means for effecting the punching of perforations thereon in index positions corresponding to the numerical values of the sensed numerals, permits the entry of the original data on the card to be done in a more natural way, resulting in increased speed and accuracy of recording the original data, while the transcribing of the original data to punched data form is effected automatically in an accurate and speedy manner. In recording the original data on the records, wide variations in the shape of the numerals is permitted.

A preferred embodiment of the invention may include intermittently driven record advancing means for moving each record through a punching position comprising a line of punches, so that each row of index positions of the record pauses momentarily in the punching position to receive a perforation if any of the punches are operated at that time. Disposed below the intermittent feed path of the records, a short distance before the punching position, is a sensing unit comprising a line of individual sensing devices arranged at right angle to the path of movement of the record. Each sensing device comprises a common contact member and a plurality of individual contact elements deployed in a specific manner. The original numeric data is recorded on each record in a line adjacent its leading edge, and, after this portion of the record is positioned above the sensing devices and the record is stopped momentarily, a pneumatic platen may be operated to force the recording area of the card against the sensing devices so that all the numerals marked in conductive ink on the record are sensed.

Through the distinctive shape of the conductive line or lines forming each numeral, a distinctive pattern of the individual contact elements of each sense device is electrically connected to the related common contact member and, as a result, an individual circuit associated with each contact element so connected becomes energized. The individual circuits associated with the contact elements of each sensing device that are not connected to the related common contact member remain unenergized. Thereafter, as the index point positions of the record move step by step under the line of punches, circuit means controlled by the energized and deenergized circuits associated with the contact elements of each sensing device, control the operation of an associated punch for perforating the record card at an index point position corresponding to the numeric value of the related recorded numeral on the record.

An object of this invention is to provide simple and reliable means for automatically sensing conductive control characters which have been written or preprinted on a record in conventionally legible form, and means to control work devices in accordance with the characters sensed.

Another object of this invention is to provide simple and reliable means for automatically sensing conductive Arabic numerals which have been written or preprinted on a record, and means to control individual work devices at differential times in accordance with the value of each numeral.

Another object of this invention is to provide simple and reliable means for automatically sensing electrically conductive numerals which have been written on a record in conventionally legible form, wherein numerals of the same value may have wide variations as to configurations within predetermined limits and yet be correctly interpreted by the sensing means.

Another object of this invention is to provide means to automatically sense electrically conductive numerals which have been written on a record with possible wide variations as to configuration, and means to effect perforation of the same record at index positions as determined by the sensed numeric information thereon.

Another object of this invention is to provide an improved record perforating machine wherein conductive numerals written or preprinted on a record, with possible wide variations as to individual configuration within predetermined limits, are sensed simultaneously and automatically, and wherein perforating devices are operated to effect perforation of the same record at index point positions as determined by the values of the sensed numerals.

Other objects of the invention will be pointed out in the following description and claims and illustrated in the accompanying drawings which discloses, by way of example, the principle of the invention and the best mode, which has been contemplated, of applying that principle.

In the drawings:

Fig. 1 is a partial vertical section taken through a portion of the improved record perforating machine.

Fig. 2 is an enlarged vertical section taken on the line 2—2 of Fig. 1 and shows the detailed construction of the sensing unit and hydraulic platen.

Fig. 3 shows the type of records utilized in controlling the record perforating machine, one record having preprinted numeral information, while the other record has written numerical information recorded therein.

Fig. 4 is a schematic representation of the position of a numeral 5 relative to the related sensing device during an actual sensing operation.

Fig. 5 is a schematic representation of the area in each numeral recording field within which any one of the ten possible numerals should be recorded for correct interpretation by the related sensing device.

Figure 6:
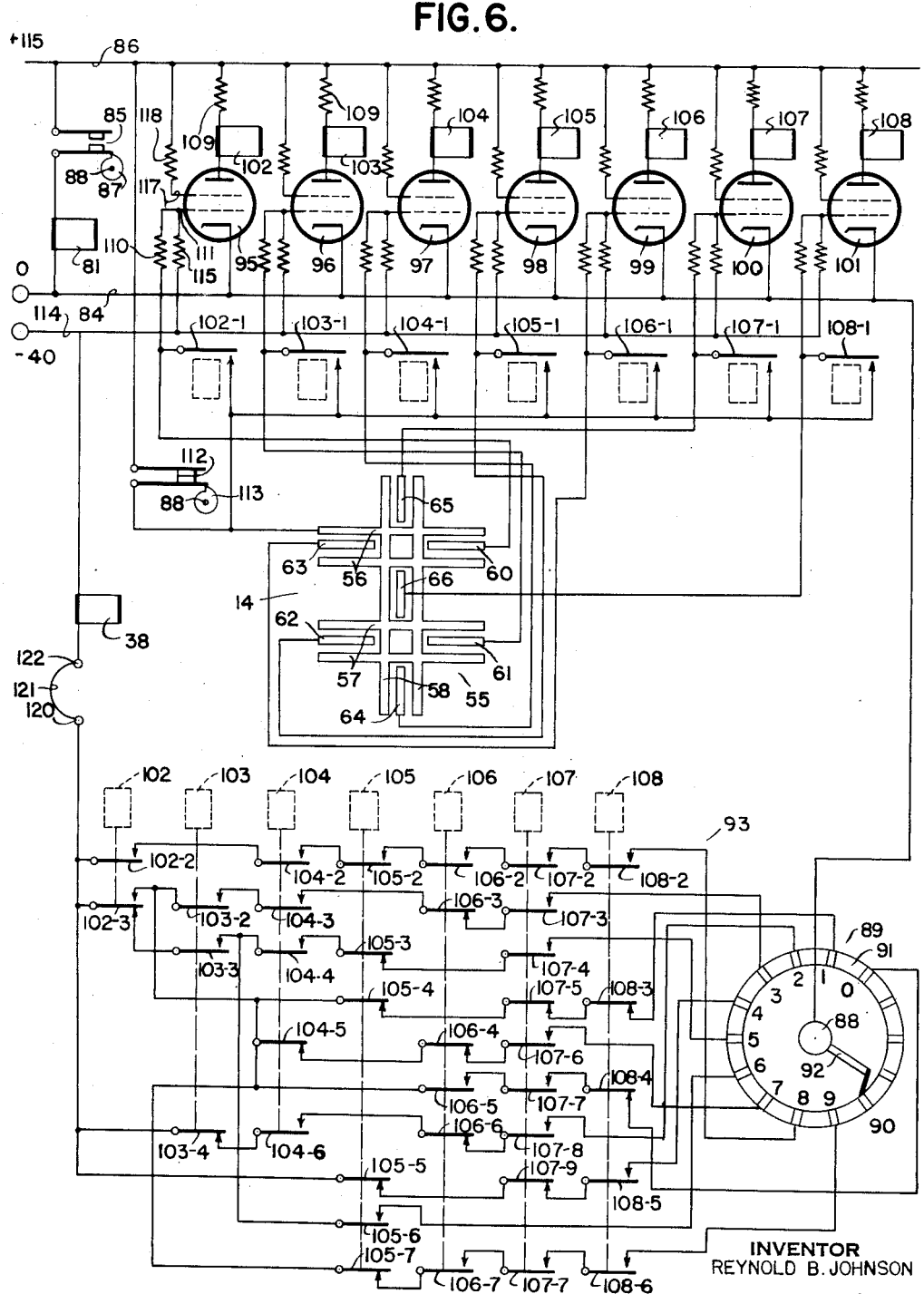
Fig. 6 is a schematic diagram of the added control circuitry for the improved record perforating machine.

Referring to Fig. 1, there is shown a partial view of a cyclically operated perforating machine similar to that disclosed in Reissue Patent 21,113, issued on June 27, 1939, to Clair D. Lake. In the present machine, however, a sensing unit generally designated 10 has been incorporated in a punch die 11, and a hydraulic platen generally designated 12 has been added to a stripper plate 13, the hydraulic platen being operable to press a record into intimate contact with the sensing unit which is comprised of a line of individual sensing devices 14. As the above mentioned patent may be referred to for a complete and detailed description of the driving means and the operation of the card feeding and punching mechanisms of the perforating machine, this description will be confined to the specific additions to the machine and to such parts as necessarily cooperate with the added devices.

A hopper 15 is adapted to receive a stack of record cards 17 as shown, and a picker 16 is oscillated each machine cycle, by mechanism fully described in the above mentioned patent, to advance the bottom card of the stack from the hopper into the feed rollers 18 and 19, which are intermittently driven by a Geneva gearing arrangement as also described in the Lake patent. The record cards utilized in the machine are of conventional tabulating card size and are divided laterally into the standard IBM 12 index positions and longitudinally into 80 columnar positions as shown in Fig. 3. It will be noted in Fig. 3 that there are 10 spaces across the top of the card in which numeral information may be preprinted with conductive ink as on record 21, or on which numeral information may be written with conductive ink as on record 22. The records are fed 12 index point first, with the side of the cards on which the numeral information is recorded in conductive ink being downward. After a record is fed from the hopper by the picker 16, the intermittently driven feed rollers 18 and 19 advance the record in index point increments between the hydraulic platen 12 and the sensing unit 10, and then under a single line of 80 punches 24, there being one punch for each columnar position of the card. When the numeral recording area of the record is directly above the sensing unit and during an interval when the record is momentarily stationary, the hydraulic platen is operated to press the record into intimate contact with the sensing unit so that simultaneous sensing of each possible numeral recording position of the record is effected. By this sensing operation, the numeric value of each numeral marked in conductive ink on the record is determined. Thereafter, as the feed rollers 18 and 19 move the various index positions of the card successively under the punches, the card pauses momentarily at each index point position so that if a perforation is to be effected at that index position, in accordance with the related sensed and interpreted numeral on the record, the related punch 24 has time to penetrate and withdraw from the punched card before it is advanced to the next index position. The feed rollers 25 and 26, which are also intermittently driven by the same mechanism as rollers 18 and 19, continue the index point advance of each record after its trailing edge moves out of contact with the rollers 18 and 19.

*Punch mechanism*

The perforating mechanism used in the improved record perforating machine is identical in construction and operation to the related mechanism fully described in the previously mentioned Reissue Patent 21,133. The punching mechanism comprises the previously mentioned line of 80 punches, each punch 24 being slidably mounted in suitable holes in the stripper plate 13 and a fixed bar 27, and adapted to move into openings 30 in the punch die 11. The punches are arranged so as to be in alignment with the 80 columnar positions of the records as they are advanced index point by index point between the stripper plate 13 and the punch die 11. Pivotally connected to the top of each punch 24 by a pin 28 is an interposer pawl 29. The interposer pawls are guided by slots in a plate 31 fastened to a stationary bar 32, and a spring 34 connected between the plate 31 and each pawl, normally holds the pawl out of the path of a bail 35 carried by side arms 36. Each pawl 29 is normally latched to the edge of the plate 31 and holds the punch 24 in its upper position, as shown in Fig. 1. Associated with each of the interposer pawls is a punch controlling magnet 38 supported on a bracket 39. Attached to the bracket 39 are arms 40 supporting a terminal bar 41 from which electrical connections may be made to each magnet. The armature 43 of each punch controlling magnet is mounted on an associated lever 44 pivoted at 45 to the bracket 39. The lower end of lever 44 is pivotally connected to a call wire 46 which is pivotally connected at 47 to the related interposer pawl 29. The 80 call wires, one for each punch controlling magnet 38 and related interposer pawl 29, are guided and supported by suitable slots in a plate secured to the fixed bar 50. Upon the energization of a punch controlling magnet 38, the associated armature swings the lever 44 in a counter-clockwise direction in Fig. 1, and draws the related call wire 46 to the right to urge the corresponding interposer pawl 29 clockwise. As the interposer pawl pivots, a notch 52 in the pawl is urged into cooperation with the bail 35 so that a downward movement of the bail causes the punch to operate to penetrate the record card.

The bail arms 36 are pivotally mounted at 51 on the main side frame of the record perforating machine and are rocked counter-clockwise by mechanism described in the above-mentioned patent, during each interval when the record cards are momentarily stationary and a particular index position of a record card is directly under the line of punches. If a particular punch controlling magnet is energized to effect a punching operation, it remains energized throughout the entire punching operation to maintain the related interposer pawl 29 in engagement with the bail 35 as the latter rocks counter-clockwise to effect punching, and as the bail restores clockwise to withdraw the punch from the record so that feeding of the record to the next index position may take place. An extension on a fixed bar 53 cooperates with the upper ends of the interposer pawls to cam them in a counter-clockwise direction out of engagement with the bail 35 at the end of its return or clockwise rocking motion.

*Sensing unit*

The sensing unit 10 comprises ten individual sensing devices 14 which are supported in a block 54 formed of an electrical insulating material, there being one sensing device for each numeral recording position on the record cards. The block 54 is supported in a recess extending across the top of the punch die 11, and the top of the block is flush with the die. The associated sensing devices are, thereby, arranged side by side in a line across the path of movement of the records. Each sensing device includes a common contact member 55 made up of two pairs of cross bars 56 and 57 and a single pair of bars 58 extending at right angles to the cross bars 56 and 57. Arranged between and yet not contacting the oppositely projecting ends of each pair of cross bars is an individual contact element designated 60, 61, 62 or 63. Similarly arranged between each of the projecting ends of the bars 58 is a contact element 64 or 65 as shown in Fig. 6. Also arranged between the two pairs of cross bars 56 and 57 and the bars 58 is a similar contact element 66. There are seven of these contact elements in all as shown, and by the construction above described, each sensing device 14 is in effect divided into seven distinctive areas, each area consisting of a contact element 60 to 66 arranged between portions of the cross bars 56, 57 or the bars 58, these bars comprising the common contact 55. The top surfaces of the seven individual contact elements, and the top surfaces of the common contact member are coplanar with each other and with the top of the block 54 in which they are mounted, while their lower ends extend through the block into the recess 68 so that individual circuit connections may be made to each of the contact elements 60 to 66 and to the common contact member 55, as shown schematically in Fig. 6.

A numeral, which is preprinted or written with a conductive material on a tabulating card as shown in Fig. 3, when superposed upon its related sensing device 14 and pressed into intimate contact therewith, electrically connects a specific pattern of the contact elements to the common contact member, dependent upon the configuration of the numeral, while the remaining contact elements of the sensing device remain disconnected from the common contact. For example, with a numeral 5 of conductive material pressed against one of the sensing devices 14 while positioned as shown in Fig. 4 relative to the sensing device, the contact elements 61, 63, 64, 65 and 66 are electrically connected to the common contact member 55, while the contact elements 60 and 62 remain disconnected from the common contact. As a result, an individual circuit associated with each contact element 61, 63, 64, 65, and 66 is energized, while the individual circuits associated with each of the contact elements 60 and 62 remain deenergized. The specific pattern in which the circuits associated with the contact elements 60 to 66 are energized or deenergized determines the numeric value of the conductive numeral being sensed. For example, the numeral 5 will be recognized by the failure to complete the individual circuits through the contact elements 60, 62, while completing the individual circuits associated with the contact elements 61, 64, and 65, the simultaneous completion of circuits through the contact elements 63 and 66 being superfluous. In a similar manner, the remaining numerals are distinguished from each other in accordance with a coded arrangement as shown in the following table:

| Number | Contact Elements 60 to 66 that must be connected to common contact member 55 | Contact elements 60 to 66 that must not be connected to common contact member 55 |
| --- | --- | --- |
| 1 | 60 | 62, 65, 66 |
| 2 | 64, 65 | 61, 63 |
| 3 | 60, 61, 64, 65 | 63 |
| 4 | 66 | 62, 65 |
| 5 | 61, 64, 65 | 60, 62 |
| 6 | 61, 62 | 60 |
| 7 | 60, 65 | 63, 64 |
| 8 | 60, 62, 63, 64, 65, 66 | None |
| 9 | 60, 63, 65, 66 | 62 |
| 0 | 60, 63, 65 | 66 |

The general recording areas in each numeral recording position on a record within which the different numerals must lie in order to complete the correct pattern of circuits associated with the contact elements, is shown schematically in block numeral outline in Fig. 5. Each numeral may be placed with possible wide variation as to exact shape any place within the block area outlined for that particular numeral. However, it is essential that each of the numerals be positioned relative to the guide circles 70 and 71 as indicated by the block outlines, and also be formed so as to connect the contact elements to the common contact member as indicated for each numeral in Fig. 5. The guide circles 70 and 71 aid in correctly marking each numeral on the record and, during an actual sensing operation, the record card is so positioned that the guide circle 70 coincides with juncture of cross bars 56 and bars 58 of the common contact, while the guide circle 71 coincides with the juncture of cross bars 57 and bars 58 of the common contact member. In marking a numeral one, for example, in any one of the ten possible recording positions on a record, it is necessary only that the numeral be formed to the right of the corresponding guide circles 70 and 71 and cross the contact element 60 as indicated by the dotted lines in Fig. 5. In recording a numeral two, as a further example, it is necessary only that the numeral be formed around the guide circles 70 and 71 within an area as outlined in Fig. 5, and also cross the contact elements 64, 65, as indicated. The numeral two may be written with wide variations as to shape as indicated and yet conform to the conditions enumerated above so that it will be correctly interpreted as a numeral two. Similar wide variations in shape is permitted for the remaining numerals, and, as a result, only very limited restrictions are imposed on the writing style and writing speed of the person recording the original numeral data on the records.

*Hydraulic platen*

The previously mentioned hydraulic platen 12, as shown in Figs. 1 and 2, operates each machine cycle, when a record card is positioned with its numeral recording position directly over the sensing unit and during an interval when the record is momentarily stationary, to press the record against the sensing unit so that a simultaneous sensing of all the numeral recording positions on the record may be made. The platen consists of a flexible rectangular tube 73 which is supported in a recess 74 in the stripper plate 13 and extends across the entire sensing unit, the lower surface of the platen normally being coplanar with the surface of the stripper plate and, therefore, clear of the path of the records. A metal tube 75 connects one end of the flexible tube 73 with a hydraulic cylinder 76 having a piston 77 adapted for reciprocation therein, the flexible tube 73, metal tube 75, and cylinder 76 all being filled with a suitable fluid. The outer end of the piston 77 is pivotally secured to one end of a lever 79, the other end of which is pivotally secured to an extending frame portion 80 of a solenoid 81, which in turn, is secured to the record perforating machine frame in any suitable manner. At a point intermediate its two ends, the lever 79 is pivotally connected to the plunger 82 of the solenoid so that when the solenoid is energized, the piston 77 moves further into the hydraulic cylinder and, as a result, forces the fluid through the tube 75 and effects the expansion of the flexible tube 73. The walls of the recess 74 in the stripper plate prevent the expansion of the flexible tube in all directions except towards the sensing unit 10 so that if a record card is positioned between the platen and the sensing unit at that time, it is pressed firmly against the sensing unit.

Referring to Fig. 6, it will be noted that one lead of the solenoid 81 is connected to a power line 84 maintained at a ground potential, while the other lead is connected to one side of a normally open cam actuated contact 85, the other side of the contact being connected to a power line 86 maintained at a positive potential of 115 volts. The cam 87 for closing the contact 85 is mounted on a driven shaft 88 of the record perforating machine as described in the previously mentioned patent, this shaft being timed to the movement of the records from the hopper, between the platen 12 and the sensing unit 10, and thence underneath the line of punches. The cam 87 momentarily closes the cam contact 85 each machine cycle and completes a circuit from the power line 86, through the solenoid 81, to the power line 84, for effecting operation of the platen during the time interval when the numeral recording position of a record is directly over the sensing unit and the record is momentarily stationary.

*Circuits*

There is provided for each of the sensing devices 14 of the sensing unit a control circuit identical with that shown in Fig. 6. In explaining the operation of this circuit, it will be understood that the similar circuits of the remaining sensing devices 14 function in the same manner. The circuit, as shown, includes an emitter 89 that is common with and utilized in the similar circuits of the nine other sensing devices of the sensing unit. The emitter comprises a number of electrically conductive segments 90 embedded in a stationary supporting ring 91 formed of an insulating material, and a conductive brush 92 which is adapted to sweep over the inner ends of the segments 90. The outer ends of the segments 90, labelled 0 to 9, are connected by individual conductors to a network generally designated 93, while the brush 92 is connected to the power line 84. The brush 92 is secured to the previously mentioned shaft 88 which rotates in a timed relationship with the movement of records through the record perforating machine as previously mentioned. The brush is positioned on the shaft so that during the interval when a record card is stationary and its "0" index position is directly under the line of punches, the brush is engaging the inner end of the "0" segment 90 of the emitter. In a similar manner, the inner ends of the remaining segments 90 labelled "1" to "9" are each engaged by the brush during the intervals when the related index point of the record card is directly under the line of punches and the record is momentarily stationary.

The control circuit of Fig. 6 also includes controlling vacuum tubes 95, 96, 97, 98, 99, 100, and 101 and related relays 102, 103, 104, 105, 106, 107, and 108 respectively, for the contact elements 60, 61, 64, 62, 63, 65, and 66, respectively, of the particular sensing device 14 shown. Associated with each of the relays are a number of contact points, the position of which is dependent upon whether the related relay is energized or deenergized; Fig. 6 showing the position of the relays' points when their related relays are unenergized. The relay points of relay 102 have been labelled 102–1, 102–2, 102–3, while the relays' points of the remaining relays 103 to 108 have been labelled in a corresponding manner. The cathode of each of the tubes 95 to 101 is connected to the power line 84, while the plate is connected through the related relay 102 to 108 and a resistor 109, to the power line 86. Each of the contact elements 60 to 66 of the sensing device is connected through a current limiting resistor 110 to the control grid 111 of the related vacuum tube as shown. The common contact member 55, made up of the pair of cross bars 56 and 57, and the bars 58, is connected through a cam actuated contact 112 to the power line 86. The cam 113 for operating the contact 112 is secured to the previously mentioned shaft 88 and is so positioned on the shaft so as to close the contact during the majority of the machine cycle and open it for only a short interval from shortly before the end of each cycle to slightly after the beginning of the next cycle. Under normal conditions, each of the vacuum tubes 95 to 101, which are beam type power tubes, is biased to cutoff by a negative voltage applied to the control grid by a circuit extending from a power line 114, which is maintained at a potential of —40 volts, through a grid resistor 115 of appropriate size, and thence to the control grid 111. The screen grid 117 of each tube is maintained at a suitable positive potential by a circuit extending from the power line 86, through a resistor 118, to the screen grid of the tube. The number 1 normally open point of each of the relays 102 through 108 is connected in parallel with each of the related contact elements 60 to 66 of the sensing device 14.

The above described circuit elements function as hereinafter explained to effect the sensing of numeral information written or preprinted on records with a conductive medium, and to effect the perforation of each sensed record in accordance with the value of the sensed numeral information. Upon the closing of contact 112 by cam 113 shortly after the beginning of each machine cycle, the common contact member 55 is electrically connected to the power line 86 by a circuit extending from the power line 86, through the contact 112, to the common contact member. As a result, the pairs of cross bars 56 and 57 and the bars 58, which comprise the common contact member, assume a positive potential of +150 v. At this same time, the record which was fed from the hopper 15 during the previous cycle and advanced by the intermittently driven rollers 18 and 19, has assumed a momentarily stationary position wherein the numeral recording position of the record is directly over the sensing unit 10. Shortly thereafter during the interval while the record is still stationary and occupying the above described position, the contact 85 is momentarily closed by the cam 87 to complete a circuit from the power line 86, through the contact 85, and the solenoid 81, to the power line 84. With the resultant energization of the solenoid 81, the piston 77 of the hydraulic cylinder 76 is forced to the right in Fig. 2 to effect the operation of the platen 12 in the manner previously explained. The platen presses each of the ten numeral recording positions of the record into intimate contact with their related sensing devices 14 of the sensing unit 10. As a result, the contact elements 60 to 66 of any one of the sensing devices that is crossed by a line of the related preprinted or written numeral on the record card, is electrically connected through the resistance of the printed or written conductive line to the related common contact member. This results in the completion of a circuit in the form of a voltage divider extending from the power line 86, through the contact 112, now closed, through the common contact 55, through the conductive line of the sensed numeral, through the contact element 60 to 66 of the related sensing device, and through the resistors 110, 115 to the power line 114. The control grid 111 of the related vacuum tube 95 to 101 is, as a result, subjected to a positive voltage which causes the tube to conduct so that the corresponding relay, such as relay 102, is energized by a circuit extending from the power line 86, through the relay 102 and the tube 95, to the power line 84. Upon the energization of any of the relays 102 to 108 of a particular sensing device 14 in the manner explained above, the number 1 point of the energized relays closes to complete a holding circuit for that relay by maintaining the grid of the related vacuum tube at a positive potential when the original circuit to the grid of the tube, by which the tube was rendered conductive, is broken. This original circuit is broken upon the opening of the contact 85 by the cam 87, resulting in the deenergization of the solenoid 81 and, as a consequence, the platen 12 releases the record from the sensing unit to break the circuits through the conductive lines of the recorded numerals thereon. The holding circuit for each relay 102 to 108 energized during the sensing operation extends from the power line 86, through the cam actuated contact 112, through the #1 point of the energized relay, through the related resistor 110, through the resistor 115, to the power line 114.

It will be appreciated that the entire sensing operation takes place during the interval when the record is momentarily stationary and correctly positioned over the sensing unit. Near the end of the sensing interval, the platen 12 is rendered inoperative by the deenergization of the solenoid 81 as described above, whereafter the intermittently driven feed rollers 18 and 19 advance the record to its next index position. Any of the relays 102 to 108 of a particular contact device that are energized during the sensing interval of the cycle are held energized through hold circuits as explained above, until the contact 112 is opened by the cam 113 near the end of the machine cycle. The contact points of the energized relays, other than the holding circuit contacts #1, are arranged in the network 93 as shown and serve to complete a circuit through the correct segment 90 of the emitter 89 to effect the operation of the related punch controlling magnet 38 at the time when the index position of the record, corresponding to the value of the recorded numeral on that record, is in a position to be perforated.

For example, assume that a numeral five has been written or preprinted at any one of the ten numeral recording positions on a record and during the sensing interval as previously described, the hydraulic platen 12 presses this recorded numeral five against one of the sense devices 14 of the sensing unit as shown schematically in Fig. 4. As a result, the portions of the line forming the numeral which engage the contact elements 61, 63, 64, 65, and 66 of that sensing device render the related vacuum tubes 96, 97, 99, 100, and 101 conductive to energize the corresponding relays 103, 104, 106, 107, and 108. These conducting tubes and related energized relays are maintained in this energized condition by the previously described hold circuits completed through the 103–1, 104–1, 106–1, 107–1, and 108–1 points after the platen 12 is rendered inoperative by the opening of cam contact 85, and the record card continues its index point by index point advance through the medium of rollers 18 and 19 and rollers 25 and 26. With these relays energized, their corresponding points shown as normally open in the network 93 of Fig. 6, are closed, while the points shown as normally closed points are opened. It will be remembered that a numeral 5 is recognized by a sensing device by the completion of circuits through the contact elements 61, 64, 65, of the sensing member and the failure to complete circuits through the contact element 60 and 62. During the sensing of the numeral five as described in the example above, it will be remembered that circuits were also completed through the contact elements 63 and 66 resulting in the energization of the related relays 106 and 108, however, this is of no consequence and does not effect the desired result as will be hereinafter evident. When the five index point of the record is directly under the line of punches and is momentarily stationary, the conductive brush 92 is engaging the "5" segment 90 of the emitter so that a circuit is completed from the power line 84, through the conductive brush 92, through the "5" segment of the emitter, through the normally open 107–4 point, now closed as relay 107 is energized, through the normally closed 105–3 point, still closed as relay 105 is unenergized, through the normally open 104–4 point, now closed as relay 104 is energized, through the normally open 103–3 point, now closed as relay 103 is energized, through the normally closed 102–3 point, still closed as relay 102 is unenergized, to the hub 120, through a plug-wire 121 to one of the 80 punch hubs 122, through the related punch controlling magnet 38, to the power line 114. The resultant energization of the punch controlling magnet 38 engages the related interposer pawl 29 with the bail 35 which forces the related punch 24 through the five index position of the desired column of the record. The numeral five recorded on the record has, therefore, been correctly interpreted so as to effect the perforation of the five index position of the record in the desired column. It will be appreciated that the punch controlling magnets 38 of the 80 punches provided for the record perforating machine are connected to separate plug hubs 122. Consequently, the output of the sense hub 120 may be connected by plugwire so as to effect the perforation of the five index point of the record card in any one of its 80 columnar positions. In a manner similar to that explained for the numeral five, the sensing of any of the other numerals recorded on the record effects the perforation of the record at index positions corresponding to the values of the related numerals. When any one of the characters is sensed, only one circuit is completed from the emitter to the magnet 38, and that circuit leads from the emitter segment 90 which corresponds to the character sensed.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. Apparatus for generating a differentially timed signal in accordance with the magnitude of an Arabic numeral recorded in a field of a record with conductive and visible material, said numeral being formed relative to two guide indications on said record so as to cross one or more of a plurality of code areas of the field dependent upon its absolute value, said apparatus comprising, in combination, a sensing device against which the conductive numeral field of the record is pressed, said sensing device including an insulating structure having a planar face, a common contact member formed in the shape of a cross having a body and 2 spaced pairs of arms, said contact member being imbedded in said insulating structure with one edge of the arms and body of said cross being coplanar with the face of said insulating structure, a plurality of contact elements, each imbedded in said insulating structure and spaced from a related position of said cross member so as to define an area corresponding to a related code area of the record field, each said contact elements also having edges coplanar with said insulating structure face and adapted to be electrically connected to said adjacent common contact positions when engaged by a portion of any numeral on said record of a configuration to pass through that area, a plurality of relays, one for each of said contact elements and electrically connected thereto for energization when the related contact element is electrically connected to said common contact member, each relay having at least one front and back contact controlled thereby, a decoding network including the contacts of said relays connected so as to form ten possible maze circuit paths, one for each of the numerals, each of said possible maze circuits having an input and an output, the outputs of said maze circuits being connected to a common circuit terminal, a circuit being available from the input of the particular maze circuit corresponding to the value of the numeral sensed to said common circuit terminal, means for generating a series of differentially timed pulses, one for each of the numerals, and means for applying each of said pulses to a related one of said maze circuit inputs to accordingly generate on said common circuit terminal a differentially timed impulse corresponding to the numeral sensed.

2. Apparatus for generating a differentially timed signal in accordance with the magnitude of each order of a value recorded in Arabic form with conductive and visible material, each order of the value being recorded in a distinct field of the record and formed relative to two guide indications therein so as to cross one or more code areas of the associated field dependent upon its numeral value, said apparatus comprising, a plurality of contact sensing devices, one for each of the orders of the recorded value and against which the related record field is pressed to effect sensing, with all fields of the record being sensed simultaneously, each sensing device including an insulating structure having a planar face, a common contact member formed in the shape of a cross having a body and 2 spaced pairs of arms, said contact member being imbedded in said insulating structure with one edge of the arms and body of said cross being coplanar with the face of said insulating structure, a plurality of contact elements, each imbedded in said insulating structure and spaced from a related portion of said cross member so as to define an area corresponding to a related code area of the record field, each of said contact elements also having edges coplanar with said insulating structure face and adapted to be electrically connected to said adjacent common contact portion of the contact sensing device when engaged by a portion of the electrically conductive numeral in the corresponding record field pressed thereagainst, a plurality of relays, one electrically connected to each contact element and energized when that contact element is electrically connected to the related common contact member, at least one front and back contact associated with each of said relays and controlled thereby, a separate decoding circuit for each of said sensing devices, each decoding circuit including the relay contacts of the related relays arranged so as to form ten possible maze circuit paths, one for each of the numerals, each possible maze circuit having an input and an output, the output of the possible maze circuits of each decoding network being linked to a related common circuit terminal for that decoding network, a circuit being available from the input of the particular maze circuit corresponding to the value of the numeral sensed in the related record field, to the associated decoding circuit common circuit terminal; a distributor having a plurality of contact points, one for each of the numerals, and which are successively connected to a power source, separate input circuits connecting each of said distributor contacts to a related maze circuit input of the decoding network of each of said sensing devices, wherein an electrical circuit is completed through said distributor and each decoding network to the related common circuit terminal at a differential time in accordance with the valve of the corresponding order of the sensed numeral.

References Cited in the file of this patent
UNITED STATES PATENTS

| | | |
|---|---|---|
| 1,117,184 | Goldberg | Nov. 17, 1914 |
| 2,007,391 | Bryce | July 9, 1935 |
| 2,063,481 | Bryce | Dec. 8, 1936 |
| 2,137,131 | Cheli | Nov. 15, 1938 |
| 2,275,396 | Johnson | Mar. 3, 1942 |
| 2,372,882 | Daly et al. | Apr. 3, 1945 |
| 2,407,196 | Watson | Sept. 3, 1946 |
| 2,607,841 | Rufle | Aug. 19, 1952 |
| 2,609,050 | Roth | Sept. 2, 1952 |